June 4, 1929.   E. G. THOMAS   1,715,800
TESTING DEVICE
Filed Sept. 2, 1925   2 Sheets-Sheet 1
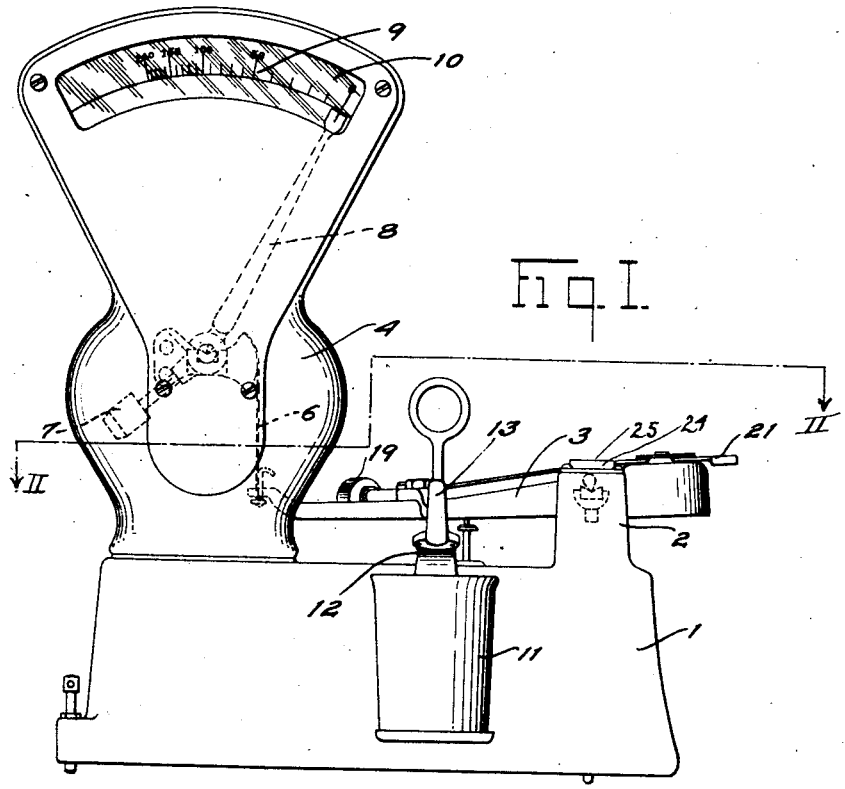
Fig. I.
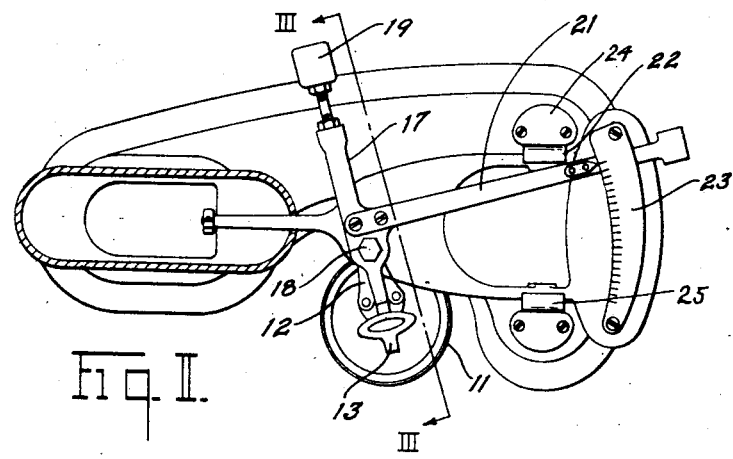
Fig. II.
Inventor
Edward G. Thomas.
By C. D. Marshall,
Attorney

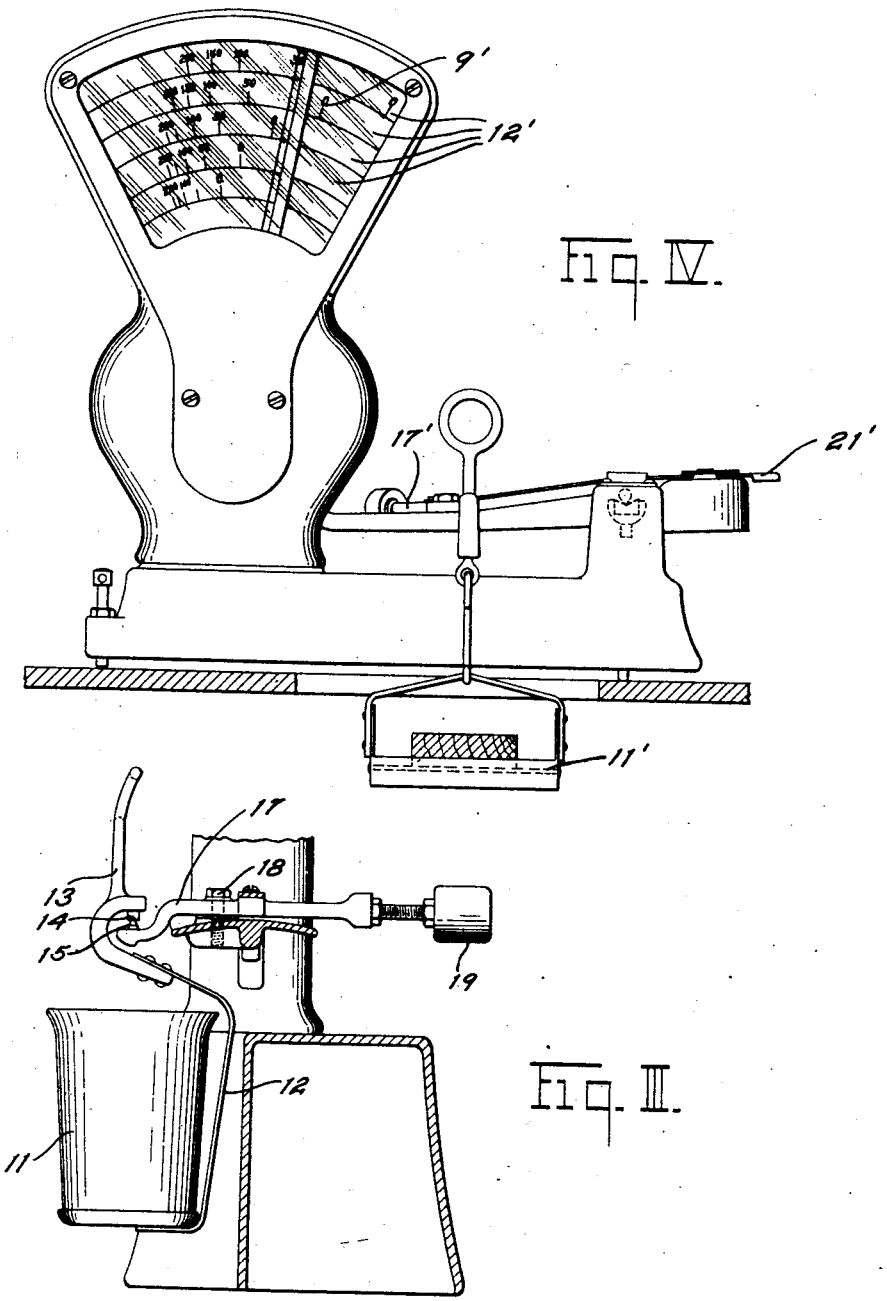

Patented June 4, 1929.

1,715,800

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

TESTING DEVICE.

Application filed September 2, 1925. Serial No. 53,967.

This invention relates to testing devices, and more particularly to means for determining and indicating the percentage of gain or deficiency of weight of a treated mass of material over an untreated mass of the same bulk or volume.

One of the principal objects of the invention is the provision of a device of this character capable of giving a practically instantaneous direct reading of the percentage of gain or loss in weight of a commodity of a given size or the percentage of gain in bulk or volume of a commodity of a given weight.

Still a further object is the provision of simple and efficient means for determining and indicating the relation of weights of commodities having substantially the same volume.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a scale embodying my invention, the embodiment here shown being particularly adapted to determine and indicate the percentage of overrun in a mix of ice cream or similar material;

Figure II is a top plan view of the scale illustrated in Figure I, the housing being shown in section;

Figure III is an enlarged transverse sectional view through a portion of the scale taken substantially on the line III—III of Figure II; and Figure IV is a front elevational view of a scale similar to that shown in Figure I and portrays another embodiment of my invention particularly adapted for determining the percentage of moisture in lumber or similar material.

Referring to the drawings in detail, the mechanism of the scale is supported upon a base 1 having integral upwardly projecting horns 2 provided with bearings upon which is pivoted a lever 3. One end of the lever 3 projects into an upright housing 4 erected upon one end of the base 1 and is suitably connected by means of a ribbon 6 to a load-counterbalancing pendulum 7 fulcrumed within the housing. The pendulum is also provided with an indicating hand 8 which is adapted to co-operate with a suitably graduated chart 9 located in the fan-shaped upper part of the housing 4 and visible to the operator through an arcuate window 10.

The commodity receiver of my device, which is adapted to receive a quantity of the material to be tested, comprises a substantially cylindrical container or cup 11 normally supported upon a bracket 12 which is secured to a member 13. The member 13 is provided with a recessed bearing 14 adapted to rest upon a cone pivot 15 which is fixed in one extremity of an arm 17, the latter being pivotally connected to the lever 3 by means of a screw 18. The other end of the arm 17 is provided with a threaded member adapted to receive a weight 19, the weight being capable of sufficient adjustment to bring the arm 17, container 11 and associated parts to a balance about the axis of the screw 18 so that relative movements of the empty container will not affect the load-counterbalancing and indicating mechanism. In order to conveniently shift the container to various positions, I have provided an operating handle 21 having an indicating pointer 22 adapted to co-operate with a graduated sector 23 to indicate the relative position of the container.

In order to prevent dust and other foreign matter from falling into the bearings they are protected by bearing caps 24, which have extensions 25 extending over the adjacent portions of the lever 3.

In the operation of my device when used as an ice cream overrun testing scale, the container 11 is first filled with a definite volume of the mix or unfrozen cream and the container and contents placed upon the supporting bracket 12. As the container 11, arm 17 and associated parts have been previously balanced about the axis of the screw 18, the only weight affecting the load-counterbalancing and indicating mechanism is that of the contents of the container. By proper manipulation of the handle 21 the container may be moved to a position bringing the index on the indicator hand 8 into registration with the zero graduation on the chart 9. The container 11 and bracket 12 may then be disengaged from the pivot 15 on the end of the arm 17 by grasping the handle 13 without disturbing the relative positions of the arm 17 and handle 21. A sample of the aerated or frozen cream of the same volume or bulk as that which has been removed from the scale is then placed in the container 11 and the same replaced in its normal position upon the arm 17. For example if a sample of aerated cream causes the indicator hand 8 to move into registration with the graduation on the chart designated 100, this indicates an overrun of the cream equal to 100%—viz, the weight of the present contents of the container being equal to one half the weight of the preceding sample.

In the modified form of my invention illustrated in Figure IV the mechanism of the device is substantially the same as the mechanism hereinbefore illustrated and described, with the exception that a supporting grid 11' has been substituted for the cylindrical cup or container 11, this construction also necessitating a special support for the scale to provide ample clearance for the grid 11'. The graduations on the chart 9' are also arranged in a different manner for a purpose to be hereinafter explained. This form of the device is particularly useful in determining the percentage of moisture in various materials, as, for example, lumber, wool, etc. In the operation of determining the percentage of moisture in lumber, a sample of the lumber which has not been treated in the drying kiln is first placed upon the grid receptacle 11'. It will be apparent that if only one zero mark were placed upon the chart the size of the test block would have to be kept within very narrow limits in order that the limited movement of the arm may be sufficient to bring the indicator hand into registration with such zero mark. To obviate this difficulty I have provided a plurality of rows of graduations 12', the initial or zero marks of the several rows being arranged in echelon so that if the weight of the test block should vary greatly from a predetermined standard the indicator may be brought into registration with one of the zero marks by manipulating the handle 21'. After the indicator hand has been brought into registration with one of the zero marks the test piece of material is removed from the grid 11' and placed in a kiln for treatment. After the moisture has been evaporated from the piece it is again placed upon the grid 11' and the graduation, of the row of graduations bearing the zero mark which was employed as the initial position of the indicator, in registration with the indicator hand indicates the percentage of decrease in weight of the piece due to the removal of the moisture therefrom.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, weighing mechanism including a relatively movable chart and index, a plurality of rows of graduations on said chart having their zero indications arranged in echelon, a commodity-receiver connected to said weighing mechanism and adapted to receive a predetermined quantity of material, and means for adjusting said commodity receive relative to said weighing mechanism to effect a registration of said index with one of said zero indications.

2. In a device of the class described, in combination, weighing mechanism including a lever and a relatively movable chart and index, a plurality of rows of graduations on said chart having their zero graduations arranged in echelon, a commodity-receiver pivotally connected to said lever and adapted to receive a predetermined quantity of material, adjustable means for constantly counterbalancing the weight of said commodity-receiver, and means for adjusting said commodity-receiver relative to said weighing mechanism to effect a registration of said index with one of said zero graduations.

3. In a device of the class described, in combination, weighing mechanism including a lever, a relatively movable chart and index co-operating therewith, a commodity-receiver pivotally connected to said lever and movable relative to said weighing mechanism, said commodity receiver adapted to receive predetermined quantities of materials, and means including an indicator hand and a second chart having a plurality of rows of graduations representing percentages co-operating with said weighing mechanism for indicating the relation of weights of various materials of substantially the same volume.

4. In a device of the class described, in combination, weighing mechanism including a relatively movable chart and index, a plurality of rows of graduations on said chart having their zero graduations arranged in echelon, a commodity-receiver connected to said weighing mechanism and adapted to receive a predetermined quantity of material, and means whereby said commodity-receiver may be adjusted relatively to said weighing mechanism to cause said index to co-operate with one of said rows of graduations.

5. In a device of the class described, in combination, lever mechanism, differential balancing means connected to said lever mechanism, a relatively movable chart and index co-operating with said lever mechanism, a plurality of rows of graduations on said chart having their zero graduations arranged in echelon, a commodity-receiver operatively connected to said lever mechanism and adapted to receive a predetermined quantity of material, and means whereby said commodity-receiver may be adjusted relative to said lever mechanism to cause said index to move into registration with one of said zero graduations.

6. In a device of the class described, in combination, weighing mechanism including a lever, a relatively movable chart and index co-operating with said weighing mechanism, a commodity-receiver pivotally connected to said lever and adapted to receive a quantity of material, a plurality of rows of graduations on said chart having their zero graduations arranged in echelon, and means whereby said commodity-receiver may be adjusted relative to said lever to cause said index to move into registration with one of said zero graduations.

7. In a device of the class described, in combination, weighing mechanism including a lever, a relatively movable chart and index co-operating with said weighing mechanism, an arm pivotally connected to said lever, a commodity-receiver adapted to receive a quantity of material removably secured to said arm, a plurality of rows of graduations on said chart having their zero graduations arranged in echelon, and means whereby said commodity-receiver may be adjusted to cause said index to move into registration with one of said zero graduations.

8. In a device of the class described, in combination, a frame, weighing mechanism including a lever supported upon said frame, a chart, an indicator connected to said weighing mechanism and adapted to co-operate with said chart, an arm pivotally connected to said lever, a commodity-receiver removably secured to said arm, adjustable means carried by said arm for substantially counterbalancing said commodity-receiver irrespective of its position, and means connected to said arm whereby the commodity-receiver may be adjusted to cause said indicator to move into registation with a predetermined mark on said chart.

EDWARD G. THOMAS.